US010803508B1

(12) United States Patent
Hoover et al.

(10) Patent No.: US 10,803,508 B1
(45) Date of Patent: Oct. 13, 2020

(54) METHOD, MEDIUM, AND SYSTEM FOR DEAL SIMULATION BETWEEN MERCHANTS AND PURCHASERS (71) Applicant: Capital One Services, LLC, McLean, VA (US)

(72) Inventors: Jason Hoover, Grapevine, TX (US); Qiaochu Tang, The Colony, TX (US); Micah Price, Plano, TX (US); Stephen Wylie, Carrollton, TX (US); Geoffrey Dagley, McKinney, TX (US); Habeeb Hooshmand, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/861,884

(22) Filed: Apr. 29, 2020

(51) Int. Cl.
*G06Q 30/00* (2012.01)
*G06Q 30/06* (2012.01)
*G06Q 10/06* (2012.01)
*G06Q 30/02* (2012.01)
*G06N 7/00* (2006.01)
(Continued)

(52) U.S. Cl.
CPC .......... *G06Q 30/0631* (2013.01); *G06N 7/00* (2013.01); *G06N 20/00* (2019.01); *G06Q 10/067* (2013.01); *G06Q 20/085* (2013.01); *G06Q 30/0185* (2013.01); *G06Q 30/0206* (2013.01); *G06Q 30/0278* (2013.01); *G06Q 30/0605* (2013.01); *G06Q 40/025* (2013.01)

(58) Field of Classification Search
CPC .......... G06Q 30/0631; G06Q 30/0185; G06Q 30/0206; G06Q 30/0278; G06Q 30/0605; G06Q 10/067; G06Q 20/085; G06Q 40/025; G06N 20/00; G06N 7/00
See application file for complete search history.

(56) References Cited

U.S. PATENT DOCUMENTS 5,774,883 A * 6/1998 Andersen ............... G06Q 30/06
705/35
8,744,925 B2 6/2014 Seergy et al.
(Continued)

OTHER PUBLICATIONS

Khandani, Amir E., Adlar J. Kim, and Andrew W. Lo. "Consumer credit-risk models via machine-learning algorithms." Journal of Banking & Finance 34.11 (2010): 2767-2787. (Year: 2010).*

Primary Examiner — Matthew E Zimmerman
(74) Attorney, Agent, or Firm — Bookoff McAndrews, PLLC (57) ABSTRACT According to certain aspects of the disclosure, a computer-implemented method may be used for determining one or more vehicle recommendations. The method may include receiving at least one vehicle purchase requirement and transmitting the at least one vehicle purchase requirement to at least one merchant. Additionally, the method may include determining a vehicle cost based on the at least one vehicle purchase requirement and historical transaction information of the at least one merchant and comparing the vehicle cost with a credit profile of the purchase. Additionally, the method may include determining at least one available vehicle based on the at least one vehicle purchase requirement and the vehicle cost, wherein a price of the at least one vehicle satisfies a predetermined cost threshold based on the credit profile of the purchaser and transmitting the at least one available vehicle to the purchaser and the at least one merchant.

20 Claims, 6 Drawing Sheets (51) Int. Cl.
*G06Q 20/08* (2012.01)
*G06N 20/00* (2019.01)
*G06Q 40/02* (2012.01)

(56) References Cited

U.S. PATENT DOCUMENTS

| | | |
|---|---|---|
| 2002/0046157 A1 | 4/2002 | Solomon |
| 2007/0143195 A1 | 6/2007 | Bell et al. |
| 2009/0222357 A1* | 9/2009 | Bennett .................. G06Q 40/00 705/26.1 |
| 2011/0264552 A1* | 10/2011 | Seergy ............... G06Q 30/0627 705/26.3 |
| 2014/0067615 A1* | 3/2014 | Park ................... G06Q 30/0601 705/26.63 |
| 2014/0279171 A1* | 9/2014 | Burgiss .............. G06Q 30/0611 705/26.4 |
| 2015/0120489 A1* | 4/2015 | Edelman ............ G06Q 30/0639 705/26.4 |
| 2015/0206234 A1* | 7/2015 | Forrester ............. G06Q 40/025 705/38 |
| 2017/0098183 A1* | 4/2017 | Brockman ......... G06Q 30/0627 |
| 2017/0098262 A1* | 4/2017 | Brockman ............. G06Q 40/02 |

* cited by examiner

METHOD, MEDIUM, AND SYSTEM FOR DEAL SIMULATION BETWEEN MERCHANTS AND PURCHASERS

TECHNICAL FIELD

Various embodiments of the present disclosure relate generally to providing purchase recommendations to purchasers based on the history of the purchasers, and more specifically, to artificial intelligence-based purchase recommendations.

BACKGROUND

Purchasers of relatively expensive items, such as cars, real estate, mattresses, boats, computers, etc. may conduct part or all of their shopping for such items online, via the Internet. In researching and completing such a purchase, a consumer may visit multiple websites in search of information. For example, consumers may view inventory information or perform other research regarding a purchase (e.g., regarding a type of item to buy) on multiple websites. Different websites may recommend one or more items based on recommendation models the websites are trained on. However, the resulting recommendation may be ineffective if the recommended item is not financially accessible to the purchaser.

Furthermore, in areas of commerce such as those described above, the purchaser is at a disadvantage because the purchaser is not privileged to the large amount of transaction information that may be available to merchants to determine most advantageous transaction terms. Thus, consumers may make sub-optimal purchase decisions due to a lack of accessible and/or digestible information.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining one or more recommendations. Each of the examples disclosed herein may include one or more of the features described in connection with any of the other disclosed examples.

In one example, a computer-implemented method may be used for deal simulation for purchasers and merchants. The method may include receiving, by one or more processors, at least one vehicle purchase requirement from a purchaser; transmitting, by the or more processors, the at least one vehicle purchase requirement to at least one merchant of a plurality of merchants; determining, by the one or more processors, a vehicle cost based on the at least one vehicle purchase requirement and historical transaction information of the at least one merchant of the plurality of merchants; comparing, by the one or more processors, the vehicle cost with a credit profile of the purchaser; determining, by the one or more processors, at least one available vehicle based on the at least one purchase requirement and the vehicle cost, wherein a price of the at least one vehicle satisfies a predetermined cost threshold based on the credit profile of the purchaser; and transmitting, by the one or more processors, the at least one available vehicle to the purchaser and the at least one merchant.

According to still another aspect of the disclosure, a computer system for deal simulation for purchasers and merchants may include a memory having processor-readable instructions stored therein and a processor configured to access the memory and execute the processor-readable instructions to perform a plurality of functions. The functions may include receiving vehicle purchase requirements from a purchaser; transmitting the vehicle purchase requirements to at least one merchant of a plurality of merchants; determining a vehicle cost based on the at least one vehicle purchase requirement and historical transaction information of the at least one merchant of the plurality of merchants; comparing the vehicle cost with a credit profile of the purchaser; determining at least one available vehicle based on the at least one vehicle purchase requirement and the vehicle cost, wherein a price of the at least one vehicle satisfies a predetermined cost threshold based on the credit profile of the purchaser; and transmitting the at least one available vehicle to the purchaser and the at least one merchant.

According to another aspect of the disclosure, a computer-implemented method may be used for deal simulation for purchasers and merchants. The method may comprise receiving, by one or more processors, electronic prior transaction data corresponding to a plurality of prior successful transactions and a plurality of prior unsuccessful transactions; training, by the one or more processors, a machine learning engine based on the electronic prior transaction data corresponding to the plurality of prior successful transactions and the plurality of prior unsuccessful transactions; receiving, by the one or more processors, at least one vehicle purchase requirements from a purchaser; transmitting, by the one or more processors, the at least one vehicle purchase requirements to at least one merchant of a plurality of merchants; determining, by the one or more processors, a vehicle cost based on the purchase requirements and electronic prior transaction data; comparing, by the one or more processors, the vehicle cost with a credit profile of the purchaser; determining, using the machine learning engine, by the one or more processors, a likelihood of success of a transaction based on the comparing of the vehicle cost with the credit profile of the purchaser; determining, based on the likelihood of success, by the one or more processors, at least one available vehicle based on the at least one vehicle purchase requirement and a price of the available vehicle; and transmitting, by the one or more processors, the at least one available vehicle to the purchaser and the at least one merchant.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in an overly limiting sense.

The phrase "in one embodiment" as used herein does not necessarily refer to the same embodiment throughout the specification, and the phrase "in another embodiment" as used herein does not necessarily refer to a different embodiment. It is intended, for example, that claimed subject matter include combinations of exemplary embodiments in whole or in part.

The terminology used herein may be interpreted in its broadest reasonable manner, even though it is being used in conjunction with a detailed description of certain specific examples of the present disclosure. Certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides methods and systems for providing purchasers and merchants with advantageous transaction terms, such as while assisting a purchaser with finding and acquiring an item, such as a vehicle, that the purchaser may be interested in. While automotive vehicles are referenced herein as an exemplary subject for purchase to which the systems and methods described herein may apply, it will be understood that this disclosure is not limited to automotive vehicles and may apply to other contexts, such as the purchase or lease of real estate, technology, boats, other vehicles, mattresses, animals, travel (e.g., airline tickets, lodging, and the like) and/or other items. The systems and methods described herein may be used in order to present information to purchasers. For example, the disclosed systems and methods may be used to present a recommendation regarding a vehicle to a purchaser. The disclosed systems and methods also may learn a purchaser's preferences over time and may deliver recommendations to the purchaser in accordance with those preferences. In some embodiments, the systems and methods disclosed herein may base these recommendations at least in part on information gathered regarding the purchasing preferences of a population. For example, an application according to the disclosure may act as an adviser to a purchaser. While the disclosure includes descriptions of exemplary methods, it will be understood that the steps of each method may be combined in various combinations or permutations and/or may be mixed and matched. For example, a step from one exemplary method may be used in conjunction with steps of another exemplary method. Additionally, one or more steps from an exemplary method may be removed or repeated, and it is contemplated that other steps may be added anywhere into methods disclosed herein.

Figure 1:
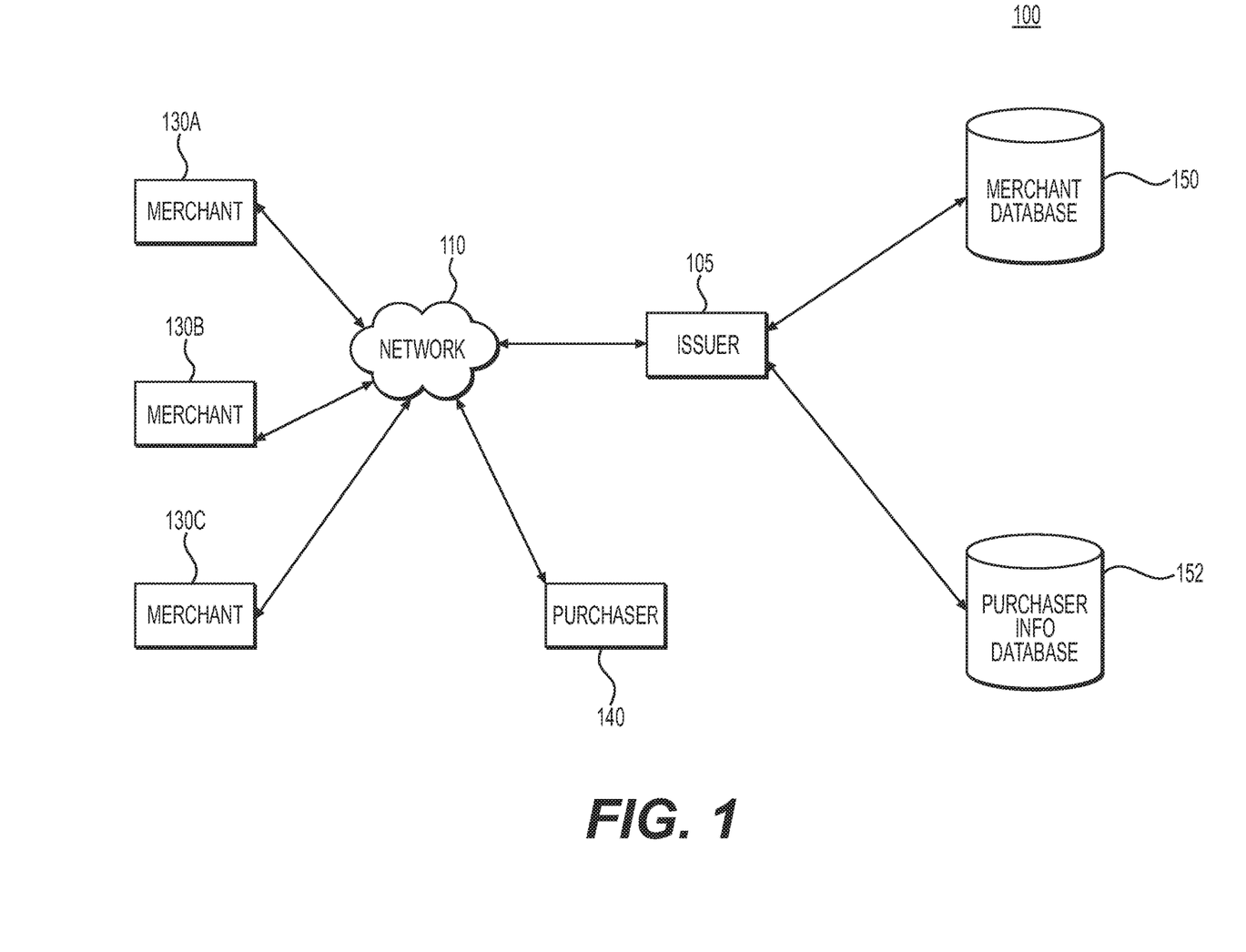
FIG. 1 depicts an exemplary environment in which systems, methods and other aspects of the present disclosure may be implemented.

Referring now to the appended drawings, FIG. 1 is a block diagram of a system environment 100 for purchasers and merchants, according to one or more embodiments. The exemplary system environment 100 may include an issuer 105, a network 110, merchants 130A-130C, a purchaser 140, a merchant database 150, and a purchaser information database 152. The issuer 105 is connected to the merchants 130A-130C and the purchaser 140 via the network 110. The network 110 may be any suitable network or combination of networks and may support any appropriate protocol suitable for communication of data between various components in the system environment 100. The network 110 may include a public network (e.g., the internet), a private network (e.g., a network within an organization), or a combination of public and/or private networks.

The purchaser 140 may have a purchaser device for communication and deal simulation. Examples of a purchaser device may include smartphones, wearable computing devices, tablet computers, laptops, and desktop computers.

The merchants 130A-130C may each be an entity that provides products. In this disclosure, the term "product," in the context of products offered by a merchant, encompasses both goods and services, as well as products that are a combination of goods and services. A merchant may be, for example, a vehicle manufacturer, a vehicle dealer, a retailer, lessor, and/or other type of entity that provides products for purchase or lease.

The issuer 105 may be an entity such as a bank, credit card issuer, merchant services provider, or other type of financial service entity. In some examples, the issuer 105 may provide the merchants 130A-130C with the ability to accept electronic payments, such as payments using credit cards and debit cards. In other examples, the issuer 105 may provide the merchants 130A-130C with the ability to process financial loans, such as vehicle loans. In some embodiments, the issuer 105 may collect and store transaction data pertaining to consumer transactions occurring at the merchants 130A-130C. References to the issuer 105 in the present disclosure may refer to a processor running under the ownership and/or management of the issuer 105.

The merchant database 150 may include previous transaction data between merchants and purchasers. Previous transaction data may include, e.g., transactions that are both successful and unsuccessful. Successful transactions may be transactions that resulted in the purchaser completing a purchase or lease. Unsuccessful transactions may be transactions that did not result in completion of a purchase or lease. Both successful and unsuccessful transaction data may include, for example, merchant identification information, and information identifying or otherwise describing the item for purchase. In the context of a vehicle, such information may include, e.g., the make of the vehicle, the model of the vehicle, the color of the vehicle, warranty, tax rate, add-ons, surcharges, interest rate, total cost of the vehicle, gap insurance, trade-ins, service agreements, number of negation rounds to arrive at the final price, and/or any other information acquired as part of the transaction.

The purchaser information database 152 may store information regarding the purchaser 140, such as name, phone number, email address, spending history, account balance, geographic location data, available credit, credit to debt ratio, credit history, credit segmentation, bankruptcy history, income amount, spending habits, age group, and demographic information.

Figure 2:
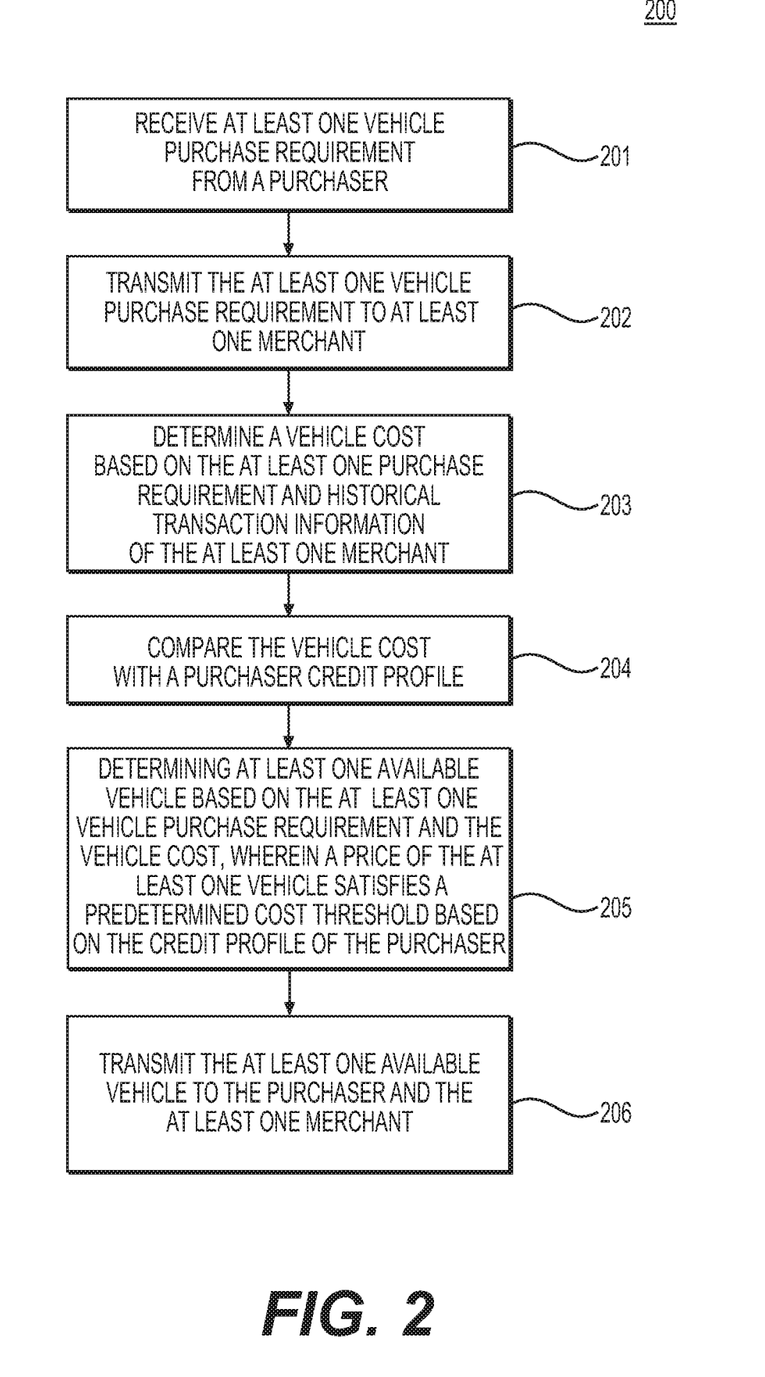
FIGS. 2 and 3 depict exemplary flow charts for deal simulation, according to one or more embodiments.

FIG. 2. depicts an exemplary flow chart of a method 200 for deal simulation between purchasers and merchants, according to one or more embodiments. While the method 200 relates to purchase of a vehicle, it is to be understood that it may equally apply to the purchase or lease of any product, including any goods or services. The method 200 may begin at step 201 where at least one vehicle purchase requirement is received from a purchaser (e.g., the purchaser 140). The at least one purchase requirement may be any one or more of a make, a model, a mileage, a total price, a monthly payment, a vehicle category, a body style, a year, a condition, a feature, a fuel economy, a drive type, a specification, or a particular merchant. The purchaser can use a purchaser device and enter the purchase requirements in a web browser, or via an application running on the purchaser device, or an application such as a chat bot. Once the purchase requirement of a vehicle is received from the purchaser, the purchase requirement may be transmitted to a merchant (e.g., one or more of merchants 130A-C) at step 202. For example, if a user is searching for a sedan made by the Honda® automotive company, then the purchase requirement (e.g., Honda®, sedan) may be transmitted to a merchant selling Honda® vehicles. In some embodiments, the purchase requirement may be transmitted to a processor containing data associated with one or more merchants (e.g., a processor located on the network 110 remotely from the one or more merchants), instead of or in addition to be transmitted to a merchant. Such a processor may be configured to, e.g., receive, sort, store, and/or analyze data associated with merchants, purchasers, and/or transactions.

At step 203, a vehicle cost based on the purchase requirement and historical transaction information of the merchant may be determined. The historical transaction information of the merchant may be related to any fees, costs, discounts or vehicle add-ons that the merchant historically may add on to any vehicle transactions. For example, merchant A may add an extended warranty to all vehicles sold by the merchant while merchant B may apply a discount to all vehicles sold by the merchant. Therefore, a vehicle potentially meeting the purchase requirement of the user may have different total costs at merchant A and merchant B even though the base price of the vehicle may be the same at both merchant A and merchant B. The determination of the vehicle cost may be performed at the merchant location, by a processor having access to data associated with the one or more merchants, on the purchaser device, by the issuer 105, or a combination thereof.

At step 204, the vehicle cost may be compared to a purchaser credit profile. The purchaser credit profile may be related to financial information of the purchaser and may be determined, e.g., in whole or in part by the issuer 105. Financial information may include, for example, credit history, loan or debt ratio, and/or an amount of money in an account the purchaser holds with the issuer 105. For example, prior to commencing a search of a vehicle based on purchase requirements, the purchaser may apply for a loan from the issuer 105. The issuer 105 may review various data related to the financial information of the purchaser and may approve the purchaser a loan of a certain financial amount. The loan may be a certain predetermined financial amount in monthly increments, or may be a certain predetermined financial amount loaned to the purchaser in total. The vehicle cost may then be compared to the purchaser loan amount approved by the issuer 105. At step 205, a determination may be made to locate at least one available vehicle based on the at least one purchase requirement and the vehicle cost, where the price of the at least one available vehicle satisfies a predetermined cost threshold based on the credit profile of the purchaser. The predetermined cost threshold based on the credit profile of the purchaser may be related to the financial amount approved for the purchaser. The predetermined cost threshold may be set by the issuer 105 or by the purchaser, and it may be a percentage threshold or an amount threshold. For example, the issuer 105 may approve a $10,000 loan for the purchaser but may also set a ten percent threshold based on the credit profile of the user. Therefore if a vehicle matching the purchase requirement of the purchaser has a cost of $10,500 the issuer 105 may increase the loan amount by the predetermined percentage without requiring the purchaser to re-apply for the loan. In some embodiments, the predetermined cost threshold may also be communicated to a merchant having a potentially available vehicle, so that the merchant may make an offer of the potentially available vehicle for a price within the predetermined cost threshold. For example, if the merchant has available vehicles matching the purchase requirement of the purchaser at a cost of $12,000, the merchant may apply a discount or remove any add-ons so that the cost of the vehicle is reduced to satisfy the predetermined cost threshold. The merchant may also direct the purchaser to any alternative vehicles which may have a cost that satisfies the predetermined cost threshold without having to apply discount or remove any add-ons. For example, when a purchaser is interacting with the merchant (e.g., either remotely or at a location of the merchant), the merchant may present the alternative vehicles to the purchaser after being informed of the predetermined cost threshold. At step 206, a list of available vehicles which satisfy the predetermined cost threshold may be transmitted to the purchaser and/or the merchant to enable the purchaser and the merchant to finalize the transaction. For example, a list of the available vehicles may be transmitted to the purchaser via a webpage or an email that the purchaser may present to the merchant. The available vehicles may also be transmitted to the merchant with information associated with the purchaser (e.g., name, phone number, email address) so that the merchant has the information available when approached by the purchaser to finalize the transaction.

Figure 3:
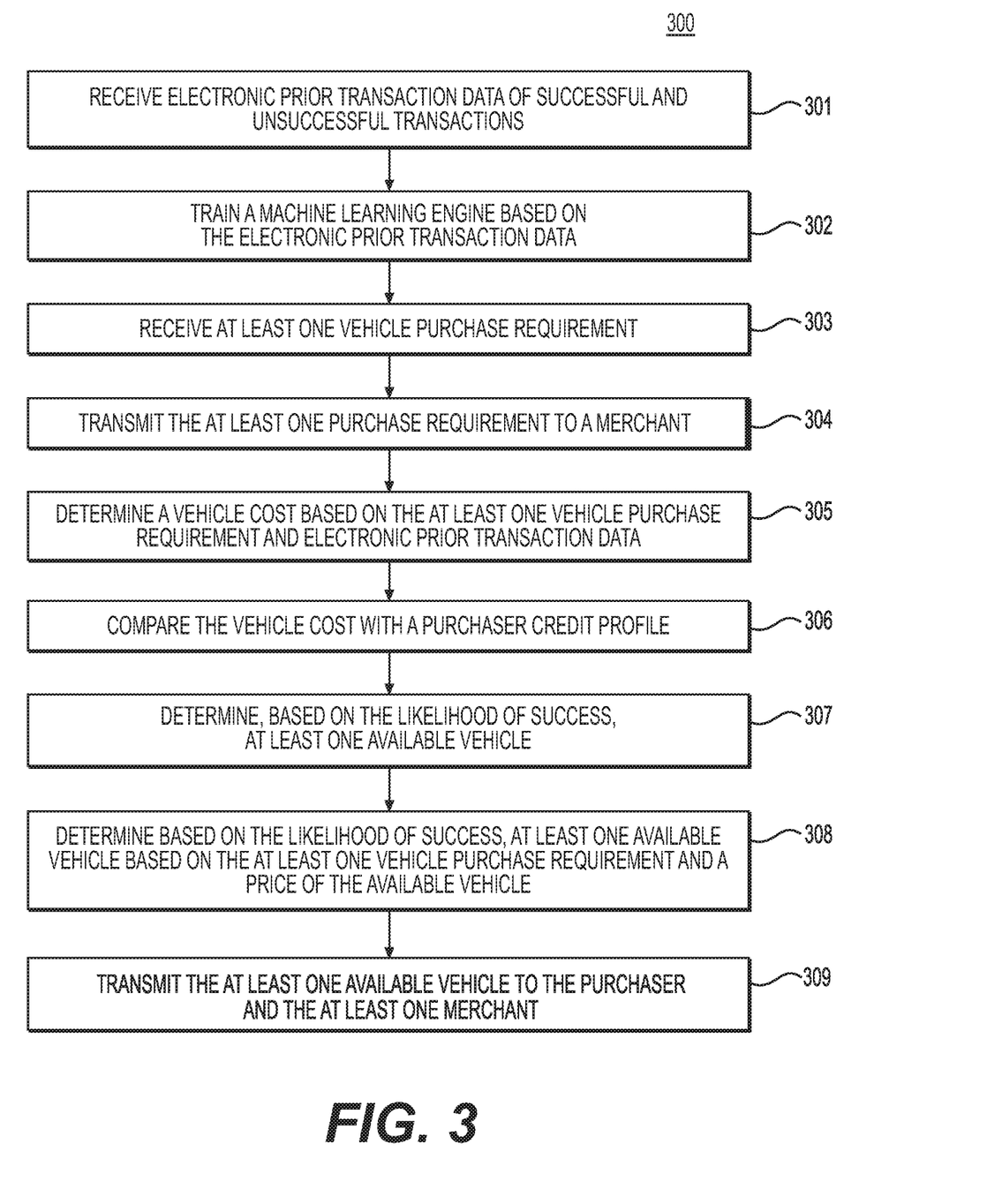

FIG. 3 depicts an exemplary method 300 for deal simulation between purchasers (e.g. a purchaser 140) and merchants (e.g., one or more of merchants 130A-C), according to one or more embodiments. The exemplary method 300 starts at step 301 where the issuer 105 may receive prior transaction data between purchasers and merchants. Transaction data may include both successful (i.e. completed) transactions and unsuccessful transactions and may correspond to data stored in the merchant database 150. At step 302 the issuer 105 may feed the prior transaction data to a machine learning engine to train the engine to recommend vehicles to purchasers. The machine learning engine may be located, e.g., at the issuer 105, or may be located remotely from issuer 105 but connected to the issuer 105 via the network 110. Any one of various machine learning models may be trained and utilized for this purpose, such as deep learning models, neural networks, a random forest model, gradient boosted machine (GBM), a Naive Bayes model, a linear or logistic regression model, a decision tree, or any other suitable machine learning model. For example, the issuer 105 may use one or more prediction models, such as one large model for all merchants and purchaser segments, or individual models for each merchant and each purchaser segment. The machine learning model(s) may be trained to recognize different merchants and any surcharges or add-ons to be included in the transaction price. Once the merchant and any associated surcharges or add-ons are recognized, the machine learning model(s) may be able to determine a total vehicle cost. The total vehicle cost may include the cost of the vehicle and any associate surcharges and/or add-ons, and may also include maintenance cost, fuel cost, insurance cost, etc. At step 303 at least one vehicle purchase requirement may be received from the purchaser (e.g., the purchaser 140) via a purchaser device. The at least one purchase requirement may be any one or more of a make, a model, a mileage, a total price, a monthly payment, a vehicle category, a body style, a year, a condition, a feature, a fuel economy, a drive type, a specification, or a particular merchant, or any other purchase requirement. The purchaser may use the purchaser device to enter the purchase requirements, e.g., in a web browser, via an application running on the purchaser device, or via an application such as a chat bot. Once the purchase requirements are received from the purchaser, the requirements may be transmitted to one or more merchants (e.g., one or more merchants 130A-C) at step 304. For example, if a user is searching for a sedan made by the Honda® automotive company, then the purchase requirement (e.g., Honda®, sedan) may be transmitted to a merchant selling Honda® vehicles. In some embodiments, at step 304, the purchase requirement may be transmitted to a processor containing data associated with one or more merchants (e.g., a processor located on the network 110 remotely from the one or more merchants), instead of or in addition to being transmitted to a merchant. Such a processor may be configured to, e.g., receive, sort, store, and/or analyze data associated with merchants, purchasers, and/or transactions. In some embodiments, the processor may host, store, include, or have access to a search platform. Such a search platform may be configured to identify products (e.g., vehicles) offered for sale by a merchant (e.g., vehicle dealership). The platform may be configured to identify products that satisfy the purchase requirement. In some arrangements, the platform may be associated with the issuer 105. In this manner, the purchase requirement may not be sent to the merchant at step 304, but may instead be sent to the issuer 105.

At step 305, a vehicle cost based on the vehicle purchase requirement and electronic prior transaction data may be determined. The prior transaction data may be based on, e.g., historical transaction information of the merchants and may be related to any fees, costs, discounts, or vehicle add-ons that the merchant historically may add on to any vehicle transactions. For example, merchant A may add an extended warranty to all vehicles it sells, while merchant B may apply a discount to all vehicles it sells. Therefore, a vehicle potentially meeting the purchase requirement of the user may have different total costs at merchant A and merchant B even though the base price of the vehicle may be the same at both merchant A and merchant B. The determination of the vehicle cost may be performed at the merchant location, by a processor having access to data associated with the one or more merchants, on the purchaser device, by the issuer 105, or a combination thereof.

At step 306, the vehicle cost may be compared to a purchaser credit profile. The purchaser credit profile may be developed by any suitable method, such as, e.g., methods described with respect to step 204 of method 200. At step 307, the trained machine learning engine from step 302 may be utilized to determine a likelihood of success of a transaction based on the comparison of the vehicle cost with the credit profile of the purchaser. For example, based on the credit profile of the purchaser, the purchaser may have received a preapproval from the issuer 105 for a predetermined loan amount. If the vehicle cost exceeds the predetermined loan amount, then the likelihood of success of the transaction may be low. However, if the vehicle cost is equal to or lower than the predetermined amount, then the likelihood of success of the transaction may be high. At step 308, based on the determined likelihood of success of the transaction, at least one available vehicle based on the at least one vehicle purchase requirement and the cost of the available vehicle may be determined. The at least one available vehicle may be, e.g., the same make and model of the vehicle for which the vehicle cost was determined in step 305. For example, if the vehicle cost determined in step 305 is equal to or lower than the predetermined loan amount, and/or if the likelihood of success of the transaction is determined to be high, then the vehicle is determined to be an available vehicle. Alternatively, the at least one available vehicle may be a different type of vehicle than the type for which the vehicle cost was determined in step 305. For example, if the vehicle cost determined in step 305 exceeds the predetermined loan amount, or if the likelihood of success of the transaction is determined to be low, then at least one alternative vehicle meeting the predetermined loan amount and/or having a higher likelihood of successfully being purchased may be determined to be available. At step 309, an identity of the at least one available vehicle may be provided to the purchaser and/or the at least one merchant by, e.g., methods described with respect to step 206 of method 200.

Figure 4:
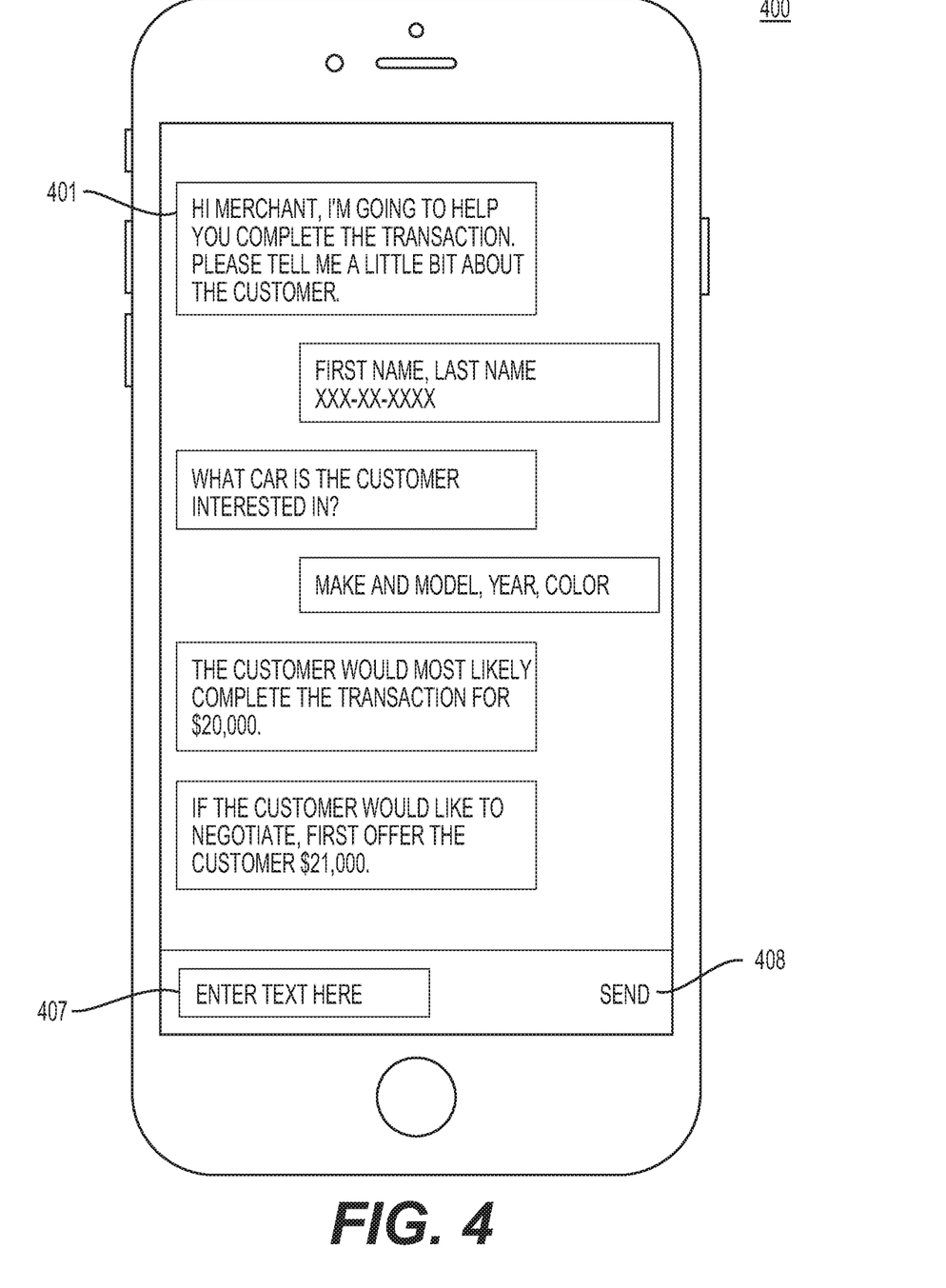
FIG. 4 depicts an exemplary user interface for a merchant for deal simulation, according to one or more embodiments.

FIG. 4 depicts an exemplary user interface 400 for a merchant for deal simulation. The user interface 400 may be executed on one or more devices used by merchants (e.g., merchants 130A-C), such as smartphones, wearable computing devices, tablet computers, laptops, or desktop computers, and may be implemented via a web browser, an application, or a chat bot. The user interface 400 may include a conversation region 401, a text input box 407, and a "SEND" button 408. The merchant may enter text in response to questions provided by the issuer 105 in the text input box 407 and then select the "SEND" button 408 to submit the information. The conversation region 401 may display information related to the deal simulation. In the embodiment depicted in FIG. 4, the deal simulation proceeds in a conversation format with the issuer 105 requesting information about a purchaser from a merchant. The issuer 105 may use the purchaser information to determine purchaser segmentation and a credit profile to use to simulate the deal. "Purchaser segmentation" may refer to placement of a purchaser into one of a plurality of predetermined segments by issuer 105. The predetermined segments may be related to, e.g., the credit profile such as credit score (e.g., less than 600, between 600-700, above 700), or may be related to demographic information, such as age, gender, race, etc. In some embodiments, segments may correspond with purchaser behavior (e.g., negotiation preferences, buying/selling frequency, distance traveled to purchase a vehicle, etc.). The issuer 105 may also request information regarding a potentially available vehicle from the merchant. The issuer 105 may take this vehicle information, the purchaser segmentation, and the credit profile to determine a price for the vehicle that the purchaser will likely accept. For example, given information about a purchaser (e.g., a credit profile and segmentation of the purchaser) and a potentially available vehicle, the issuer 105 may determine a strong likelihood that the purchaser may accept to purchase the vehicle at a price of $20,000 or less. In another example, the issuer 105 may determine that the purchaser may be in a segment of purchasers who may prefer to negotiate; therefore, the issuer 105 may recommend that the merchant first provide a higher price to the purchaser so that the purchaser may counter offer and arrive at the determined vehicle price.

Figure 5:
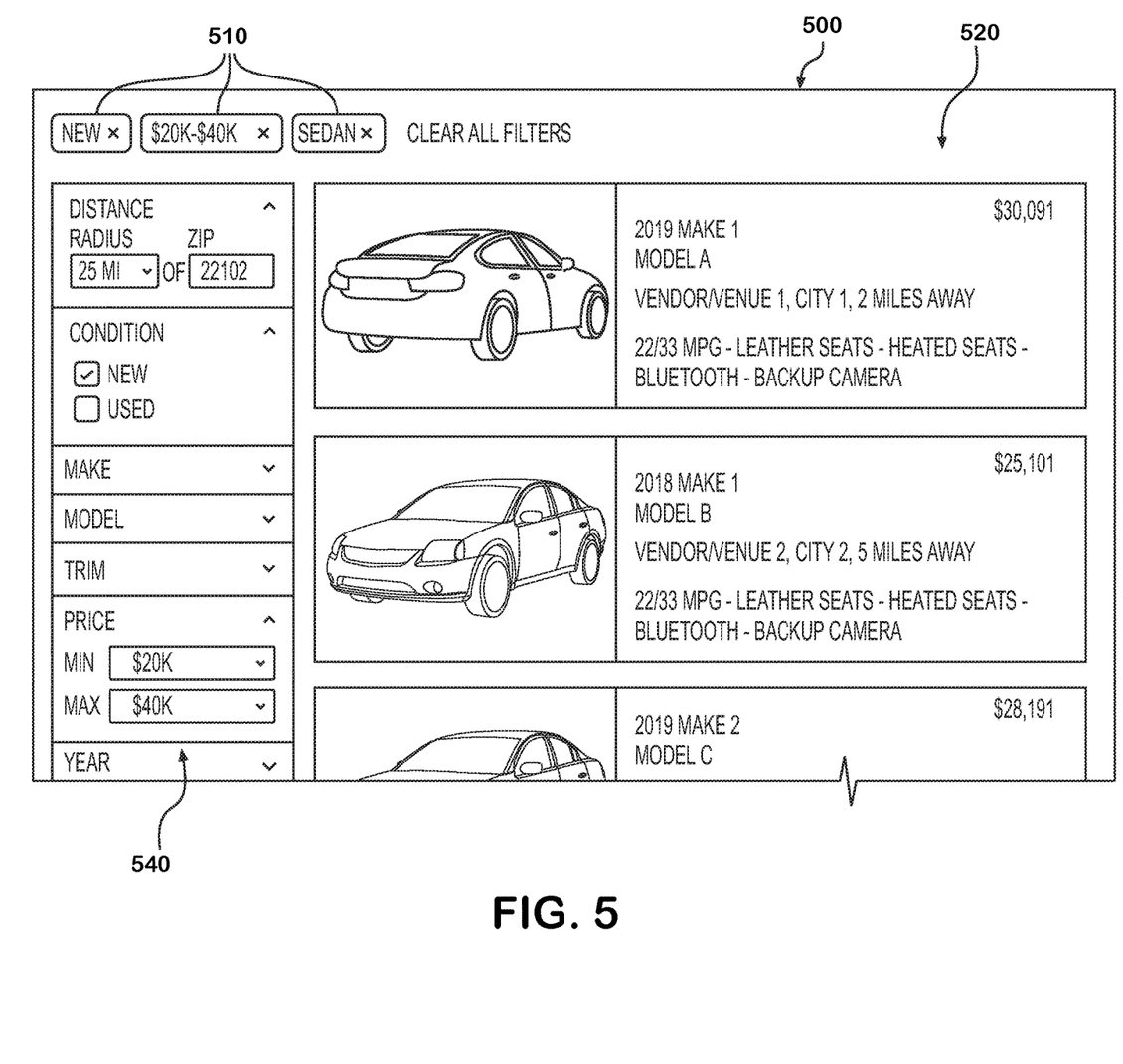
FIG. 5 depicts an exemplary user interface for a purchaser for deal simulation, according to one or more embodiments.

FIG. 5 depicts an exemplary user interface 500 for a purchaser (e.g., a purchaser 140) to use in simulating a deal (e.g., a purchase of a product, such as a vehicle). The user interface 500 may be executed on any device used by a purchaser, such as smartphones, wearable computing devices, tablet computers, laptops, or desktop computers and may be implemented via a web browser, an application, or a chat bot. The purchaser may optionally access the user interface 500 at a location that is remote from the merchant. For example, the purchaser may be at home or a coffee shop while researching which vehicle to purchase. The purchaser may also access the user interface 500 at a merchant location, such as at a vehicle dealership finalizing a purchase of a vehicle.

The user interface 500 may include purchase requirements 510, a product recommendation screen 520, and a purchase requirement input section 540. The purchaser may select requirements for a product on the input section 540. For example, the purchaser may be researching new sedans within a price range of $20,000 to $40,000, as displayed in requirements section 510. The product recommendation screen 520 may display the listed of recommended vehicles according to the purchase requirements. The product recommendation screen 520 may also display information regarding the product, such as the location of a merchant that has the product available, and features of the product (e.g., in the case of a vehicle, features such as fuel mileage, heated seats, backup camera). The product recommendation screen 520 may also display an asking price for the product. The product recommendation screen 520 may display all products that fit the purchase requirements, or only products that the purchaser can acquire as determined by the issuer 105, e.g., based on steps of methods described herein.

The price of the product (e.g., a vehicle) displayed in screen 520 may also vary depending on different factors because the lowest price provided by a merchant may not be the best price for the purchaser. In one embodiment, the purchaser may require a certain add-on to a product, and may specify as much in the input section 540; therefore, the price displayed in the screen 520 may include the add-on. In another embodiment, because the issuer 105 may have access to prior transaction data relating to merchants whose products are displayed via the user interface 500, the issuer 105 may be able to identify any fees a particular merchant may add to their transactions. Therefore, the price determined by the issuer 105 and displayed in the screen 520 may include any such fee the merchant may charge. For example, merchant 130A (e.g., VENDOR/VENUE 1) may add a $500 transaction fee to all transactions, while merchant 130B (e.g., VENDOR/VENUE 2) does not add any transaction fee. Therefore, while merchant 130A might offer a lower price on, e.g., a vehicle, the displayed price including the transaction fee on screen 520 may be higher than the displayed price for merchant 130B. In some embodiments, the price displayed may take into account a total cost of ownership of a product. For example, vehicle Model C may have a lower purchase price than vehicle Model B; however, vehicle Model C may cost more to maintain and insure than vehicle Model B, therefore vehicle Model C may have a higher total cost of ownership than vehicle Model B. In this instance, the price displayed in screen 520 may be the total cost of ownership price, indicating to the purchaser that vehicle Model B has a lower price.

In another embodiment, the issuer 105 may recommend vehicles and vehicle prices based on the purchaser's credit profile and segmentation. If a purchaser is searching for a vehicle that the purchaser may not be able to acquire because of the purchaser's credit profile, the issuer 105 may recommend different purchase requirements or vehicles to the purchaser. For example, a purchaser's low credit rating may impact the purchaser's interest rate on a vehicle loan, and the issuer 105 may therefore recommend to the purchaser a higher down payment or a lower cost vehicle to ensure that the purchaser may be financially capable of the monthly payments. The issuer 105 may also assign weights to a purchaser's requirements when determining vehicle recommendations, based on purchaser preferences. For example, a purchaser may indicate safety as a top requirement for the vehicle, and the issuer 105 may therefore assign safety a greater weight than other purchase requirements and recommend a vehicle that carries a higher safety rating over another vehicle that may have a lower price but also a lower safety rating.

Figure 6:
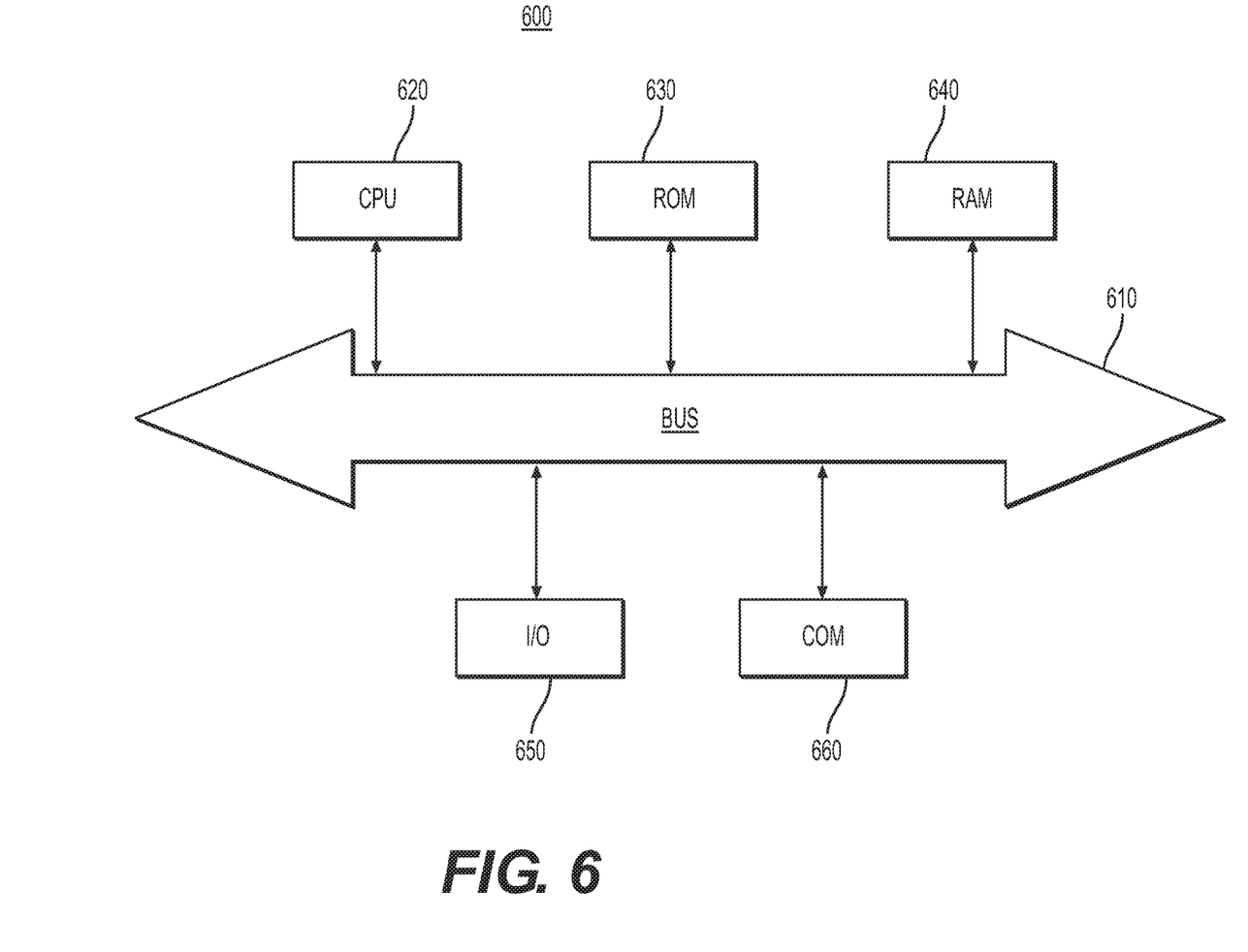
FIG. 6 depicts an exemplary computer device or system, in which embodiments of the present disclosure, or portions thereof, may be implemented.

FIG. 6 depicts a high-level functional block diagram of an exemplary computer device or system 600, in which embodiments of the present disclosure, or portions thereof, may be implemented, e.g., as computer-readable code. Additionally, each of the exemplary computer servers, databases, user interfaces, modules, and methods described above with respect to FIGS. 1-5 can be implemented in device 600 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-5.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-5, may be implemented using one or more of a device 600.

As shown in FIG. 6, the device 600 may include a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multi-processor system, such system operating alone, or in a cluster of computing devices operating in a cluster or server farm. CPU 620 may be connected to a data communication infrastructure 610, for example, a bus, message queue, network, or multi-core message-passing scheme.

Device 600 also may include a main memory 640, such as, for example, random access memory (RAM), and also may include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 also may include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link, or other communications channels.

The hardware elements, operating systems and programming languages of such equipment are conventional in nature, and it is presumed that those skilled in the art are adequately familiar therewith. Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

After reading this description, it will become apparent to a person skilled in the relevant art how to implement embodiments of the present disclosure using these or other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added to, deleted from, or repeated, in methods described herein, while remaining within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for deal simulation for purchasers and merchants, the method comprising:
receiving, by one or more processors, electronic prior transaction data corresponding to a plurality of prior successful transactions and a plurality of prior unsuccessful transactions;
training, by the one or more processors, a machine learning engine based on the electronic prior transaction data corresponding to the plurality of prior successful transactions and the plurality of prior unsuccessful transactions;
receiving, by the one or more processors, at least one vehicle purchase requirement from a purchaser;
transmitting, by the one or more processors, the at least one vehicle purchase requirement to at least one merchant of a plurality of merchants;
determining, by the one or more processors, a vehicle cost based on the at least one vehicle purchase requirement and electronic prior transaction data;
comparing, by the one or more processors, the vehicle cost with a credit profile of the purchaser;
determining, using the machine learning engine, by the one or more processors, a likelihood of success of a transaction based on the comparing of the vehicle cost with the credit profile of the purchaser;
determining, based on the likelihood of success, by the one or more processors, at least one available vehicle based on the at least one vehicle purchase requirement and a price of the available vehicle; and
transmitting, by the one or more processors, the at least one available vehicle to the purchaser and the at least one merchant.

2. The computer-implemented method of claim 1, wherein the credit profile of the purchaser includes at least one of credit score information, credit history information, financial account balance information, demographic information, or past purchase history information.

3. The computer-implemented method of claim 1, wherein the at least one vehicle purchase requirement includes at least one of a make, a model, a mileage, a total price, a monthly payment, a vehicle category, a body style, a year, a condition, a feature, a fuel economy, a drive type, a specification, or a selected one or more merchants of the plurality of merchants.

4. The computer-implemented method of claim 1, further including:
determining, by the one or more processors, whether the likelihood of success of the transaction is lower than a predetermined likelihood threshold;
in response to determining that the likelihood of success is lower than the predetermined likelihood threshold, determining one or more alternate purchase requirements that increase the likelihood of success above or equal to the predetermined likelihood threshold; and
conveying the one or more alternate purchase requirements to the purchaser and the at least one merchant.

5. The computer-implemented method of claim 1, further including:
assigning, by the one or more processors, a weighting value to the at least one purchase requirement; and
wherein the step of determining, by the one or more processors, the vehicle cost includes determining the vehicle cost based on the weighting value of the at least one vehicle purchase requirement.

6. The computer-implemented method of claim 1, wherein the at least one vehicle purchase requirement is received from the purchaser, via a purchaser device associated with the purchaser, at a location remote from the at least one merchant.

7. The computer-implemented method of claim 1, wherein the at least one vehicle purchase requirement is received from the purchaser, via a purchaser device associated with the purchaser, at a location of the at least one merchant.

8. The computer-implemented method of claim 1, further including:
receiving, from the purchaser, a selection of the at least one merchant to complete a transaction for the at least one available vehicle.

9. The computer-implemented method of claim 1, further including:
receiving, by the one or more processors, a final cost of the at least one available vehicle from the at least one merchant upon completion of a transaction between the purchaser and the at least one merchant for the at least one available vehicle.

10. The computer-implemented method of claim 1, wherein the step of determining the vehicle cost includes determining the vehicle cost based on historical transaction information of the at least one merchant of the plurality of merchants.

11. A computer system for deal simulation for purchasers and merchants, the computer system comprising:
a memory storing instructions; and
one or more processors configured to execute the instructions to perform operations including:
receiving electronic prior transaction data corresponding to a plurality of prior successful transactions and a plurality of prior unsuccessful transactions;
training a machine learning engine based on the electronic prior transaction data corresponding to the plurality of prior successful transactions and the plurality of prior unsuccessful transactions;
receiving at least one vehicle purchase requirement from a purchaser;
transmitting the at least one vehicle purchase requirement to at least one merchant of a plurality of merchants;
determining a vehicle cost based on the at least one vehicle purchase requirement and electronic prior transaction data;
comparing the vehicle cost with a credit profile of the purchaser;
determining, using the machine learning engine, a likelihood of success of a transaction based on the comparing of the vehicle cost with the credit profile of the purchaser;
determining, based on the likelihood of success, at least one available vehicle based on the at least one vehicle purchase requirement and a price of the available vehicle; and
transmitting the at least one available vehicle to the purchaser and the at least one merchant.

12. The system of claim 11, wherein the credit profile of the purchaser includes at least one of credit score information, credit history information, financial account balance information, demographic information, or past purchase history information.

13. The system of claim 11, wherein the operations further include:
   determining whether the likelihood of success of the transaction is lower than a predetermined likelihood threshold;
   in response to determining that the likelihood of success is lower than the predetermined likelihood threshold, determining one or more alternate purchase requirements that increase the likelihood of success above or equal to the predetermined likelihood threshold; and
   conveying the one or more alternate purchase requirements to the purchaser and the at least one merchant.

14. The system of claim 11, wherein the operations further include:
   assigning a weighting value to the at least one vehicle purchase requirement;
   wherein determining the vehicle cost includes determining the vehicle cost based on the weighting value of the at least one vehicle purchase requirement.

15. The system of claim 11, wherein the at least one vehicle purchase requirement is received from the purchaser, via a purchaser device associated with the purchaser, at a location of the at least one merchant.

16. The system of claim 11, wherein the at least one vehicle purchase requirement of the vehicle is received from the purchaser, via a purchaser device associated with the purchaser, at a location remote from the at least one merchant.

17. The system of claim 11, wherein the operations further include:
   receiving, from the purchaser, a selection of the at least one merchant to complete a transaction for the at least one available vehicle.

18. The system of claim 11, wherein the operations further include:
   receiving a final cost of the at least one available vehicle from the at least one merchant upon a completion of a transaction between the purchaser and the at least one merchant for the at least one available vehicle.

19. The system of claim 11, wherein determining the vehicle cost includes determining the vehicle cost based on historical transaction information of the at least one merchant of the plurality of merchants.

20. A non-transitory computer readable medium having instructions stored thereon which when executed by a processor cause the processor to:
   receive electronic prior transaction data corresponding to a plurality of prior successful transactions and a plurality of prior unsuccessful transactions;
   train a machine learning engine based on the electronic prior transaction data corresponding to the plurality of prior successful transactions and the plurality of prior unsuccessful transactions;
   receive at least one vehicle purchase requirement from a purchaser;
   transmit the at least one vehicle purchase requirement to at least one merchant of a plurality of merchants;
   determine a vehicle cost based on the at least one vehicle purchase requirement and electronic prior transaction data;
   compare the vehicle cost with a credit profile of the purchaser;
   determine, using the machine learning engine, a likelihood of success of a transaction based on the comparing of the vehicle cost with the credit profile of the purchaser;
   determine, based on the likelihood of success, at least one available vehicle based on the at least one vehicle purchase requirement and a price of the available vehicle; and
   transmit the at least one available vehicle to the purchaser and the at least one merchant.

* * * * *